Patented Aug. 6, 1946

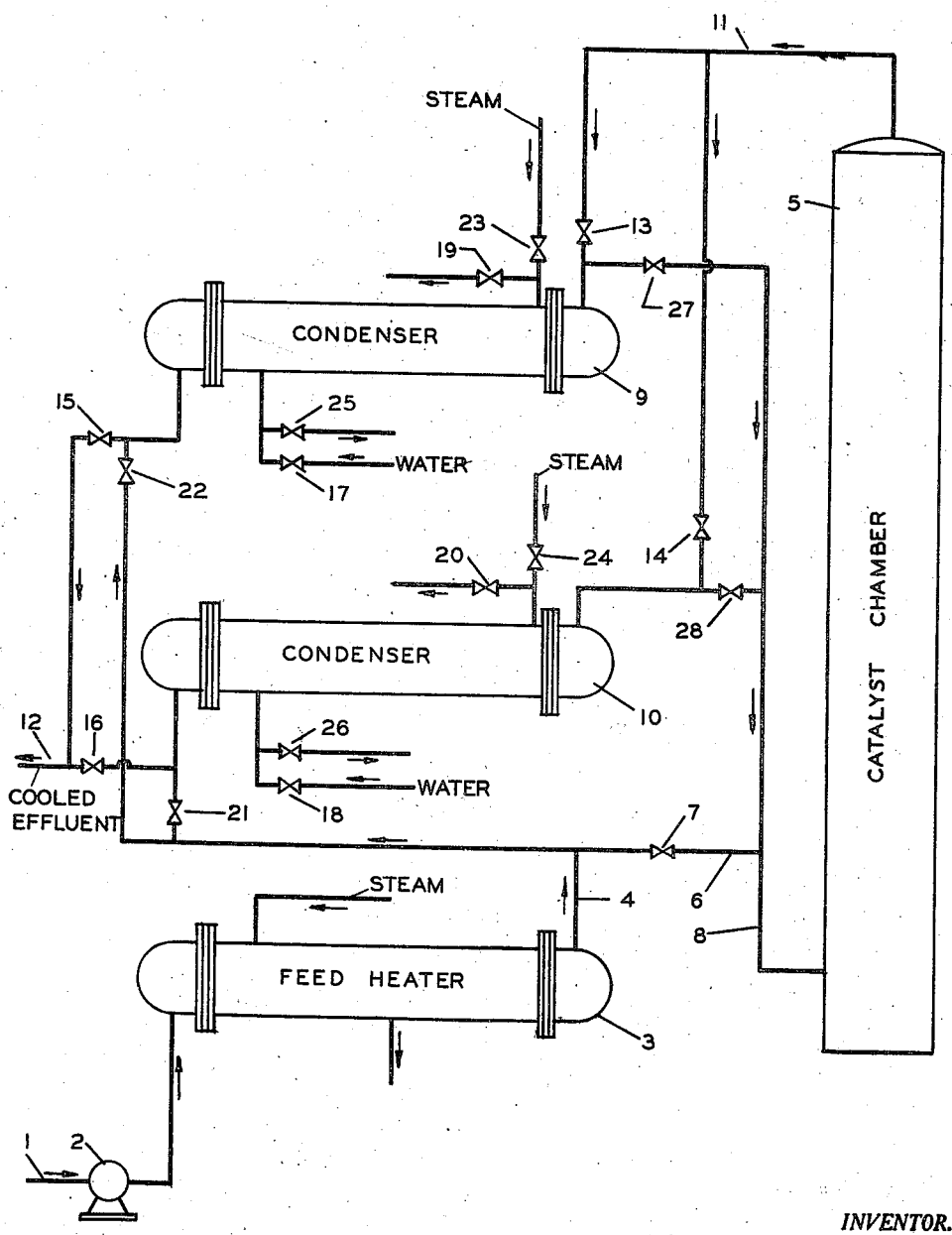

2,405,364

UNITED STATES PATENT OFFICE 2,405,364

HYDROCARBON CONVERSION PROCESS AND APPARATUS

Howard R. Markley, Oklahoma City, Okla., assignor to Phillips Petroleum Company, a corporation of Delaware Application October 5, 1942, Serial No. 460,855

5 Claims. (Cl. 260—683.5)

This invention relates to hydrocarbon conversions and more particularly to a method of obtaining satisfactory operation of such conversions wherein material is deposited from a flow stream at an undesired point in the process flow. Still more particularly it relates to a method of removing solid metal halide catalyst deposits from a point in the process flow at which they are undesirable and redepositing the catalyst so removed at another and desired point in the system. Even more specifically it relates to an improvement in the isomerization of normal butane to isobutane by means of aluminum chloride as the catalyst and wherein aluminum chloride is present in volatilized form in the vaporous isomerization effluent and is deposited in subsequent portions of the apparatus, by which improvement these deposits are removed in a highly improved manner and returned to the catalyst chamber. The invention also relates to improved apparatus for carrying out the process aforesaid.

Thus, in known processes of isomerizing normal butane to isobutane by means of aluminum chloride and in the presence of hydrogen chloride and wherein the effluent is in the vapor phase, the process being conducted in the vapor phase, volatilized aluminum chloride carries over with the vaporous effluent from the catalyst chambers. It is carried through separatory equipment, and upon cooling forms a solid deposit in water cooled condensers and in lines between the catalyst chambers and the condensers. This deposited aluminum chloride causes reduction of flow, increased pressure drop, and at some points complete stoppage in the lines and condensers. It also reduces the heat transfer in condensers and the like.

Previous practice has been to provide parallel condensers and piping, and, as soon as clogging or stoppage occurs in one condenser or line associated therewith, to remove that condenser section from service and to put the other into service. The clogged or stopped equipment was then disassembled, as by removing the condenser heads and cleaning the tubes thereof to remove the deposits. This cleaning has heretofore been done either mechanically, as by passing suitable cleaning equipment through the tubes, or by a water wash.

A great many disadvantages attend the prior practice just outlined. Among them are the following. Labor requirements are excessive, shutdowns are excessively frequent, interior corrosion results from the introduction of air and atmospheric moisture and water, the cleaning operations involve considerable hazard to personnel, the deposits thus removed are completely lost or are contaminated by contact with air and are not returnable to the catalyst chambers, and the cleaning operations subject the equipment to additional corrosion and wear.

The principal object of the present invention is to provide a method overcoming all of the disadvantages just enumerated. Another object is to provide a highly improved method for removing obstructions in equipmnet used for carrying out conversions of the type described above. Another object is to accomplish removal of the catalyst deposits and return of the catalyst to the catalyst chamber without disassembly of any equipment or exposure to air or moisture. Another object is to simultaneously preheat the feed stream and remove the catalyst obstructions, dissolve and/or suspend the catalyst so removed in the feed and return it thus to the catalytic converter. Another object is to provide a process of the foregoing type wherein normal butane is isomerized to isobutane by means of aluminum chloride or bromide and the vaporous reaction effluent is condensed in water-cooled condensers whereby the vaporous aluminum chloride or bromide deposits in and obstructs the condensers.

A further object of the invention is to partially or completely dislodge or remove material carried in the effluent from a catalyst chamber and deposited in a cooler or condenser or lines and separatory equipment between the catalyst chamber and the cooler or condenser in order to relieve a stoppage or restriction of the flow caused by the deposit. It is a further object to accomplish this dislodgement or removal of the pressure or velocity of a stream in the process flow used as a flushing stream. As will hereinafter appear, this flushing stream may or may not be entirely mechanical in its action, it may or may not contribute to, or be aided by vaporization, sublimation or dissolution of the deposited solid, and it may or may not be aided by the application of heat.

Still another object is to carry the obstructing material removed in accordance with the foregoing objects with the flushing stream back to the catalyst chamber or to some other desirable point in the process where it can be used again or discharged from the system.

Yet another object is to provide improved apparatus for effecting the foregoing objects.

Numerous other objects will hereinafter appear.

The accompanying drawing portrays diagrammatically one arrangement of equipment which has been found particularly suitable for carrying out the process of the present invention as applied to the catalytic conversion of hydrocarbons by means of aluminum chloride or related normally solid readily volatilizable metal halide catalyst of the Friedel-Crafts type which appears in the vaporous reaction effluent and gives trouble by deposition in solid form in portions of the processing equipment after the catalyst chamber.

In accordance with the present invention, the foregoing objectives are attained by segregating the clogged or restricted portion of the equipment following the catalytic converter from the path of the conversion effluent flow, directing said effluent through an alternative or duplicate portion of equipment, directing a portion or all of the hydrocarbon feed in liquid phase, vapor phase or mixed phase through the clogged or restricted equipment preferably in a direction opposite to that in which the effluent flow took place, thereby cleaning out the restriction or stoppage, and thence passing the hydrocarbon feed together with the dislodged, vaporized or dissolved deposited material into the catalytic converter.

In a preferred embodiment, provision is made for heating the hydrocarbon feed stream employed as the cleaning liquid prior to and during its passage through the restricted or stopped section of equipment. Where this equipment is a water-cooled condenser cooled by water when vaporous reaction effluent is passing therethrough, this heating may conveniently be done by passing steam through the water side of the condenser during the cleansing operation.

As brought out impliedly in the foregoing, it is preferred to provide duplicate equipment so that one is being cleansed while the other is being used for effluent flow. Thus where a water-cooled condenser is provided for condensing or cooling the reaction effluent it is preferred to have at least two so that one may be cleaned by the flow of the conversion chamber feed while the other is condensing or cooling the chamber effluent. In this way, by switching the flow at predetermined intervals and preferably before deposition has occurred to an extent approaching complete stoppage, the apparatus and process may be operated continuously for extremely long intervals without shutdowns.

The invention is especially applicable to those hydrocarbon conversions wherein a readily volatilizable normally solid material is employed as the catalyst and wherein the reaction effluent is a vapor. In such cases, the catalyst is vaporized and is present in the effluent in the vapor form to a substantial degree with the result that upon cooling, as in the conduits and especially in condensers through which said effluent is directed, deposition in solid form with restriction or even stoppage of flow takes place.

An example of a conversion where the invention has found especial application is the isomerization of normal butane to isobutane with aluminum chloride or bromide or related metal halide as the catalyst and in the presence of hydrogen halide as a promoter, wherein the reaction is conducted in the vapor phase and the effluent is in vapor phase also. In such a conversion restriction or stoppage of following equipment, including lines and especially water-cooled condensers, is commonplace. This invention completely eliminates such restriction or stoppage in a simple, convenient and economical manner and without opening up any equipment, waste of solvent or waste of heat.

Referring now to the accompanying drawing, reference numeral 1 denotes the incoming normal butane feed line. Pump 2 passes the feed through feed heater 3 and thence via line 4 to catalyst chamber 5. The preheated feed may pass from line 4 via line 6, valve 7 and line 8 directly to converter 5, although as will presently appear, after operation is established or if clogging is encountered, it will pass at least partially through one of parallel condensers 9 or 10 wherein it effects a cleansing action and is additionally heated.

Catalyst chamber 5 is provided with the metal halide catalyst, usually aluminum chloride. The reaction effluent in vaporous form leaves via line 11 and then passes through that one of condensers 9 or 10 which is not being cleansed by incoming feed, and leaves the system via line 12 for further processing after being cooled sufficiently to condense out the volatilized catalyst together if desired with a portion or all of the hydrocarbon content.

The regular flow may be from line 4 via lines 6 and 8 to converter 5, the effluent passing through line 11 and thence through one or both of valves 13 and 14, condensers 9 and 10 and valves 15 and 16, respectively, to line 12 which conveys it to another part of the plant. Cooling water to condensers 9 and 10 goes in via valves 17 and 18 and leaves via valves 19 and 20 respectively. With such flow, valves 21, 22, 23, 24, 25, 26, 27 and 28 would be closed.

In the event an obstruction or restriction of flow occurs in the tubes of condenser 9 for example, valves 13 and 15 are closed, diverting all of the chamber effluent through condenser 10. Valves 17 and 19 are closed stopping the water circulation in condenser 9. Valves 23 and 25 are opened admitting steam to the water side of condenser 9. Valves 22 and 27 are opened and valve 7 closed so that the feed stream is diverted through condenser 9 before entering the catalyst chamber. This flow is maintained until pressure readings indicate that the restriction in condenser 9 has been adequately relieved. The valves may then be returned to their original positions and condenser 9 thereby returned to condensing service.

If an obstruction should occur in condenser 10, opening and closing the proper valves in the proper manner which will be obvious will divert the feed stream through condenser 9 so as to relieve its restriction.

It will be obvious that the operation of the valves to effect the desired flow may be done either manually or automatically. A convenient method is to install automatic control means of such nature that alternate flow between parallel equipment is controlled in response to the increase in resistance to flow or pressure drop caused by the deposition of the catalyst, whereby the moment restriction of a predetermined extent is built up, the effluent flow and the feed flow are switched or alternated.

An especially valuable way of carrying out conversion of the type described herein is, throughout operation, to alternate the effluent flow (and the feed flow correspondingly) between two condensers. By operating in this manner stoppage or serious restriction is completely avoided. It is preferred to do the switching before the deposited catalyst seriously interferes with fluid flow or heat transfer. In this way absolutely trouble-free operation practically indefinitely is assured.

It will be obvious that parallel lines and parallel units of all equipment which may be installed between the catalyst chamber and the condensers may be advantageously provided in the same way as duplicate alternately employed effluent condensers are described above and that in such case the same procedure described for the parallel condensers is used to flush either line or unit of equipment so interposed while the other is in service on the chamber effluent.

Among the advantages of the invention are the following:

1. Less labor is required and in case of automatic switching practically no labor is involved.
2. The system is subject to fewer shutdowns entailed by cleaning operations. Where periodic switching is practiced before a serious restriction or obstruction is built up, practically no shutdowns for cleaning are necessary.
3. Interior corrosion resulting from the introduction of air and atmospheric moisture and water as in other methods is completely eliminated.
4. The personal hazard from cleaning operations is greatly decreased.
5. The deposited material, which may still be valuable as a catalyst, may be returned in its entirety and without contamination to the catalyst chambers where it can be used again.
6. As compared with a method of removing the deposits by circulating a special solvent in an auxiliary closed system temporarily provided and in which the special solvent passes through the clogged equipment, the invention presents the advantages that the fluid stream used in my invention for flushing the clogged equipment is a part of the process flow, being the feed to the system so that it passes to the converter and carries the removed catalyst deposits thereto, and is much cheaper to use than it would be to circulate a special solvent.

The invention is particularly applicable to carrying out hydrocarbon conversions wherein the effluent vapors contain a vaporized normally solid catalyst which is normally deposited in solid form in subsequent lines and equipment. Normally solid metal halide catalysts of the Friedel-Crafts type are especially troublesome. Particularly troublesome are the aluminum halides, especially aluminum chloride and bromide. Another sublimable catalyst is zirconium chloride which is becoming increasingly important in operations where aluminum chloride has heretofore been used. Numerous other readily sublimable metal halides may be employed.

In some cases the vaporized component of the effluent that gives trouble by deposition in solid form in later equipment may be a material other than a catalyst, such as sulfur, etc. It may be a material being converted, e. g. naphthalene or anthracene, or it may be a conversion product or any other normally solid vaporous component of the effluent which can be vaporized without decomposition and which it is desirable to return to the converter unit.

It will be obvious to those skilled in the art that numerous modifications may be made in the illustrative embodiments described herein without departing from the inventive concept which is to be taken as limited only by the spirit or terms of the appended claims.

While ordinarily the feed is in vapor form after it traverses the feed heater 3 and as it is used to remove the deposits in the condensers 9 and 10, it will be understood that it may be in liquid or liquid-vapor phase. It will also be understood that the feed may be cold as it enters condensers 9 and 10 and converted to the vapor phase or to mixed phase as it passses therethrough. It is further to be noted that the conversion step in 5 may be conducted in vapor phase or in vapor-liquid phase.

I claim:

1. A process for the vapor-phase isomerization of normal butane which comprises passing a vaporous feed comprising normal butane and anhydrous hydrogen chloride through an elongated reaction zone containing a body of anhydrous aluminum chloride catalyst under conditions effecting substantial formation of isobutane and concomitant sublimation of minor amounts of aluminum chloride from said catalyst into the vaporous reaction mixture, flowing vaporous reaction effluent to a separation zone in a restricted stream under such conditions that flow would eventually be stopped by clogging of the restricted path of flow by deposition of sublimed aluminum chloride from said effluent, periodically passing said effluent through an alternative path of flow thereby isolating the deposited aluminum chloride in said first-named restricted path of flow from contact with said effluent, passing through said isolated first-named restricted path of flow in a reverse direction and on to the inlet of said reaction zone a minor portion of vaporous feed comprising normal butane under conditions effecting sublimation of deposited aluminum chloride and consequent freeing of said restricted path of flow from clogging material, returning said effluent to its thus-cleansed former path of flow, and continuing during the entire series of steps a continuous flow of the major portion of said vaporous feed comprising normal butane and hydrogen chloride without interruption of continuity and without change in direction of flow into and through said reaction zone.

2. The process of claim 1 in which said first-named restricted path of flow is normally cooled to condense said vaporous reaction effluent prior to passage thereof to said separation zone, in which at least two such normally cooled restricted paths of flow are provided, one being cleansed by directing said minor portion of vaporous feed therethrough and simultaneously heating said path of flow which is being cleansed, while another is being used in the normal manner for condensing said effluent, and in which the flow is switched after the clogging material in the one is adequately removed.

3. The process of claim 1 in which said periodic passing of effluent through an alternative path of flow while cleansing said first-named restricted path of flow is effected automatically in response to the attainment of a predetermined increase in pressure drop across said restricted path of flow caused by deposition of aluminum chloride therein.

4. Apparatus for treatment of vapors which comprises a treating chamber containing a volatilizable treating agent, a vaporizer, a conduit for flowing vapors from said vaporizer to one end of said treating chamber, a conduit for flowing treated vapors from the opposite end of said treating chamber into either of two condensers, a conduit for flowing resulting condensate from either of said condensers, a branch conduit leading from said first-named vapor conduit for flowing vapors to either of said condensers, a conduit for flowing these vapors from said condensers back into said first-named conduit at a point therein subsequent to said branch conduit, means for supplying cooling water to either of said condensers, and means for supplying steam to either of said condensers.

5. A process for the vapor-phase conversion of hydrocarbons which comprises passing a vaporous hydrocarbon feed through an elongated reaction zone containing a body of anhydrous normally solid volatilizable metal halide catalyst of the Friedel-Crafts type under conditions effecting substantial conversion of said hydrocarbons and concomitant sublimation of minor amounts of metal halide from said catalyst into the vaporous reaction mixture, flowing vaporous reaction effluent to a separation zone in a restricted stream under such conditions that flow would eventually be stopped by clogging of the restricted path of flow by deposition of sublimed metal halide from said effluent, periodically passing said effluent through an alternative path of flow thereby isolating the deposited metal halide in said first-named restricted path of flow from contact with said effluent, passing through said isolated first-named restricted path of flow in a reverse direction and on to the inlet of said reaction zone a minor portion of vaporous hydrocarbon feed under conditions effecting sublimation of deposited metal halide and consequent freeing of said restricted path of flow from clogging material, returning said effluent to its thuscleansed former path of flow, and continuing during the entire series of steps a continuous flow of the major portion of said vaporous feed without interruption of continuity and without change in direction of flow into and through said reaction zone.

HOWARD R. MARKLEY.